No. 770,754. PATENTED SEPT. 27, 1904.
J. HUNT.
VALVE FOR AUTOMATIC FIRE EXTINGUISHERS.
APPLICATION FILED JAN. 11, 1904.
NO MODEL.
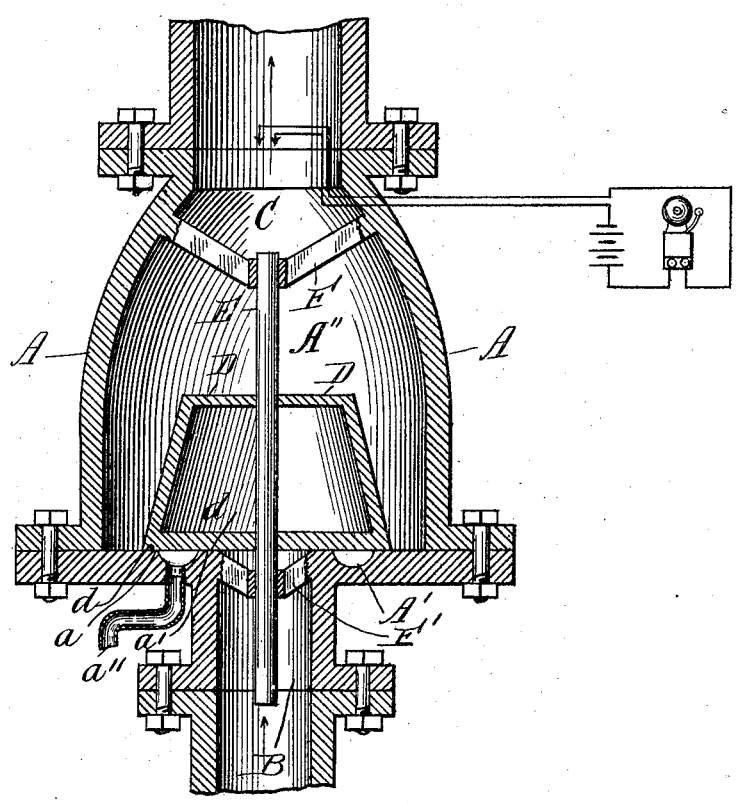
Witnesses:
Ray White.
Harry C. Coluts
Inventor:
Jarvis Hunt
By L. M. Hopkins
Atty.

No. 770,754. Patented September 27, 1904.

UNITED STATES PATENT OFFICE.

JARVIS HUNT, OF CHICAGO, ILLINOIS, ASSIGNOR TO PHOENIX FIRE EXTINGUISHER CO., OF CHICAGO, ILLINOIS, A CORPORATION OF NEW JERSEY.

VALVE FOR AUTOMATIC FIRE-EXTINGUISHERS.

SPECIFICATION forming part of Letters Patent No. 770,754, dated September 27, 1904.

Application filed January 11, 1904. Serial No. 188,498. (No model.)

*To all whom it may concern:*

Be it known that I, JARVIS HUNT, a citizen of the United States, residing at Chicago, in the county of Cook and State of Illinois, have invented certain new and useful Improvements in Valves for Automatic Fire-Extinguishers, of which the following is a specification.

The present invention relates to what is known in the art as the "main valve," being the valve which is interposed between the street-main or other source of water-supply and the riser of the distributing system.

It is well known to those skilled in the art that in dry-pipe systems the main valve, responding to water-hammer and other variations from normal conditions, sometimes becomes unseated, possibly only momentarily, but when unseated water passes it and fills the system to a greater or less extent. In this way the valve may become "columned"—that is to say, a column of water accumulates above it—and in some instances the column has sufficient weight or hydrostatic pressure to prevent the opening of the valve even upon the release of the air-pressure within the system.

There are causes other than water-hammer that result in the columning of the valve—for instance, when it is fully unseated upon the firing of one or more heads. In the absence of a catch or some mechanical appliance for holding it unseated its weight, if greater than the weight of the water which it displaces, may cause it to reseat itself, and if this takes place the differential of its upper and lower areas will cause it to be held seated as against the upward pressure of the water against its under side.

The object of the present invention is to provide a valve that cannot under any circumstances become columned; and to this end the invention consists in the features of novelty that are hereinafter described with reference to the accompanying drawing, which is made a part of this specification, and which is a sectional elevation of a valve embodying the invention.

The casing A may be of any desired construction. It has a chamber A", an inlet-orifice B, through which said chamber communicates at bottom with the street-main or other source of water-supply, and an outlet-orifice through which said chamber communicates with the riser of the system, whereby system-pressure is maintained within it. The inlet-orifice is controlled by a valve D, which is located in the chamber A", so that its upper side is exposed to the pressure in the system and its lower side is exposed to the pressure of the water in the supply-pipe. It may be guided in its movement by a stem E, passing through spiders F and F', located above and below it, respectively. The valve is a float-valve. In other words, it is buoyant. It is preferably made of metal, its lower side or bottom, which is provided with annular surfaces $d$ and $d'$, adapted to contact with the corresponding annular seats $a$ and $a'$, being sufficiently rigid to answer the purpose of a valve or cut-off, while its upper portion may be made of thin metal and of only sufficient strength to resist the pressure within the system. Between the concentric seats $a$ and $a'$ the casing is provided with an annular groove A', which is known in the art as the "low-pressure chamber," being in communication with the atmosphere through a drain-pipe $a''$. It will be readily recognized by those skilled in the art that this is a familiar form of differential valve, excepting that, unlike other differential valves preceding it in this art, it is sufficiently buoyant to float, so that without the aid of any catches or other mechanical devices it will remain unseated so long as water stands in its containing-chamber at a sufficient depth. It is this that distinguishes it from differential valves such as heretofore constructed and which makes it absolutely impossible for it to become columned. It is manifest that so long as the system remains in normal condition and charged with air under pressure the differential areas of the valve will enable the comparatively light air-pressure above it to hold it closed as against the heavy water-pressure below it. In the event of a momentary unseating of the valve due to water-hammer the small quantity of water passing the seat $a'$ will be received in the groove or low-pressure chamber $A'$ and will escape through the drain-pipe $a''$. If, on the other hand, the quantity of water passing the valve is too great to be led off in this way and forms a column above the valve, the buoyancy of the valve will unseat it and the theretofore dry-pipe system is simply converted into a wet-pipe system. This may be made manifest by the use of any suitable alarm mechanism. In the drawing I have diagrammatically represented an electrical alarm consisting of a battery, an alarm-bell, and an open circuit having contacts that will be closed by the stem E of the valve when it rises. I desire to have it understood, however, that the invention is in no way limited to the construction or character of the alarm device.

I am aware that it has heretofore been proposed to use a float for unseating a valve which controls a passage from the low-pressure chamber to the air-chamber or system and which float unseats said valve and opens said passage whenever the water rises up in the system to a given level. I am not aware, however, that it has ever been proposed to use in a fire-extinguishing system a main valve of such buoyancy that it will be unseated by the combined influences of its own buoyancy and the pressure in the service-pipes whenever the water rises up in the system to a given level and that by reason of its buoyancy alone it will remain unseated so long as its containing-chamber contains a sufficient quantity of water.

What I claim as new, and desire to secure by Letters Patent, is—

1. In a valve for automatic fire-extinguishers the combination of a casing having a chamber under system-pressure, an inlet through which said chamber communicates with a water-supply, and a differential valve located in said chamber and having its opposite sides exposed to the system-pressure and water-pressure, respectively, said valve being sufficiently buoyant to remain unseated so long as its containing-chamber contains a sufficient quantity of water, substantially as described.

2. In a valve for automatic fire-extinguishers, the combination of a casing having a chamber under system-pressure, an inlet through which it communicates with a water-supply, differential valve-seats surrounding the inlet, and a low-pressure chamber between the valve-seats, a valve located in the chamber first aforesaid and having working faces adapted to said valve-seats, said valve having its opposite sides exposed to the system-pressure and water-pressure, respectively, and being buoyant and adapted to be held unseated by its own buoyancy, substantially as described.

3. In a valve for automatic fire-extinguishers, the combination of a casing having a chamber under system-pressure, an inlet through which it communicates with a water-supply, an outlet, a low-pressure chamber disposed between the inlet and the outlet, and a valve located in the chamber first aforesaid and having differential seating-surfaces for controlling communication between the inlet and the low-pressure chamber and between the low-pressure chamber and the chamber first aforesaid, said valve being hollow and sufficiently buoyant to remain unseated in the presence of water, substantially as described.

4. In a valve for automatic fire-extinguishers, the combination with a casing having a chamber and having at bottom an inlet through which said chamber communicates with a source of water-supply and having also an outlet through which said chamber communicates with the system, of a buoyant differential valve located in said chamber for controlling the inlet, the under side of said valve being exposed to the comparatively high water-pressure and the upper side of said valve being exposed to the comparatively low air-pressure, substantially as described.

5. In a valve for automatic fire-extinguishers, the combination with a casing having a chamber and having at bottom an inlet through which said chamber communicates with a source of water-supply and having also an outlet through which said chamber communicates with the system, and having also differential valve-seats surrounding the inlet, and a low-pressure chamber between the valve-seats, of a buoyant differential valve located in said chamber and having working faces adapted to said valve-seats, the under side of the valve being exposed to the comparatively high pressure of the water and the upper side of the valve being exposed to the comparatively low pressure of the air in the system, substantially as described.

6. In a valve for automatic fire-extinguishers, the combination with a casing having a chamber and having at bottom an inlet through which said chamber communicates with a source of water-supply and having also an outlet through which said chamber communicates with the system, and having also a low-pressure chamber disposed between the inlet and the outlet, of a valve located in said chamber and having differential seating-surface for controlling communication between the inlet and the low-pressure chamber and between the low-pressure chamber and the chamber first aforesaid, said valve being hollow and sufficiently buoyant to remain unseated when submerged, the under side of said valve being exposed to the comparatively high water-pressure and the upper side being exposed to the comparatively low air-pressure, substantially as described.

JARVIS HUNT.

Witnesses:
W. E. KLEINPELL,
L. M. HOPKINS.